United States Patent [19]

Johnson, Sr.

[11] Patent Number: 4,696,381

[45] Date of Patent: Sep. 29, 1987

[54] CLUTCH AND BRAKE APPARATUS

[76] Inventor: Lee A. Johnson, Sr., P.O. Box 717, Ridgeland, Miss. 39157

[21] Appl. No.: 780,834

[22] Filed: Sep. 27, 1985

[51] Int. Cl.$^4$ ..................... F16D 67/02; A01D 69/08
[52] U.S. Cl. ................................. 192/17 R; 56/11.3; 192/75; 192/102
[58] Field of Search ........ 192/17 R, 75, 102, 105 CD; 56/11.3

[56] References Cited

U.S. PATENT DOCUMENTS

| | | | |
|---|---|---|---|
| 4,041,679 | 8/1977 | Seifert et al. | 56/11.3 |
| 4,044,533 | 8/1977 | Wick | 192/17 R X |
| 4,205,737 | 6/1980 | Harkness et al. | 192/17 R |
| 4,307,558 | 12/1981 | Bent et al. | 56/11.3 |
| 4,416,107 | 11/1983 | Hoff | 192/17 R X |
| 4,565,268 | 1/1986 | Yamamoto et al. | 192/17 R X |

FOREIGN PATENT DOCUMENTS 2919068 11/1980 Fed. Rep. of Germany ....... 56/11.3

Primary Examiner—Rodney H. Bonck
Attorney, Agent, or Firm—John M. Harrison

[57] ABSTRACT

A belt or chain-operated clutch and brake apparatus for lawnmowers which is mounted above the blade shroud or housing, and includes a shaft with a cooperating split drum assembly having a hub keyed to the shaft and oppositely-disposed, spring-loaded brake shoes bolted to opposed drum segments and pivoted to the hub plate attached to the hub. At least one drive pulley is freely rotatable on the shaft above the split drum assembly and carries a pulley drum which is shaped to define a round, downwardly extending drum flange located between the brake shoes and the drum segments in the split drum assembly. The brake shoes are biased into contact with the drum flange of the pulley drum in order to effect rotation of the split drum assembly and the shaft when the pulley is driven by a V-belt. A brake band encircles the drum segments in the split drum assembly and is secured to a fixed post at one end and a movable post at the opposite end for selectively tightening on the drum segments. Pressure exerted on the brake band pivots the drum segments and brake shoes inwardly away from the pulley drum, stops rotation of the lawnmower blade and allows the drive pulley to freely rotate on the shaft.

14 Claims, 7 Drawing Figures

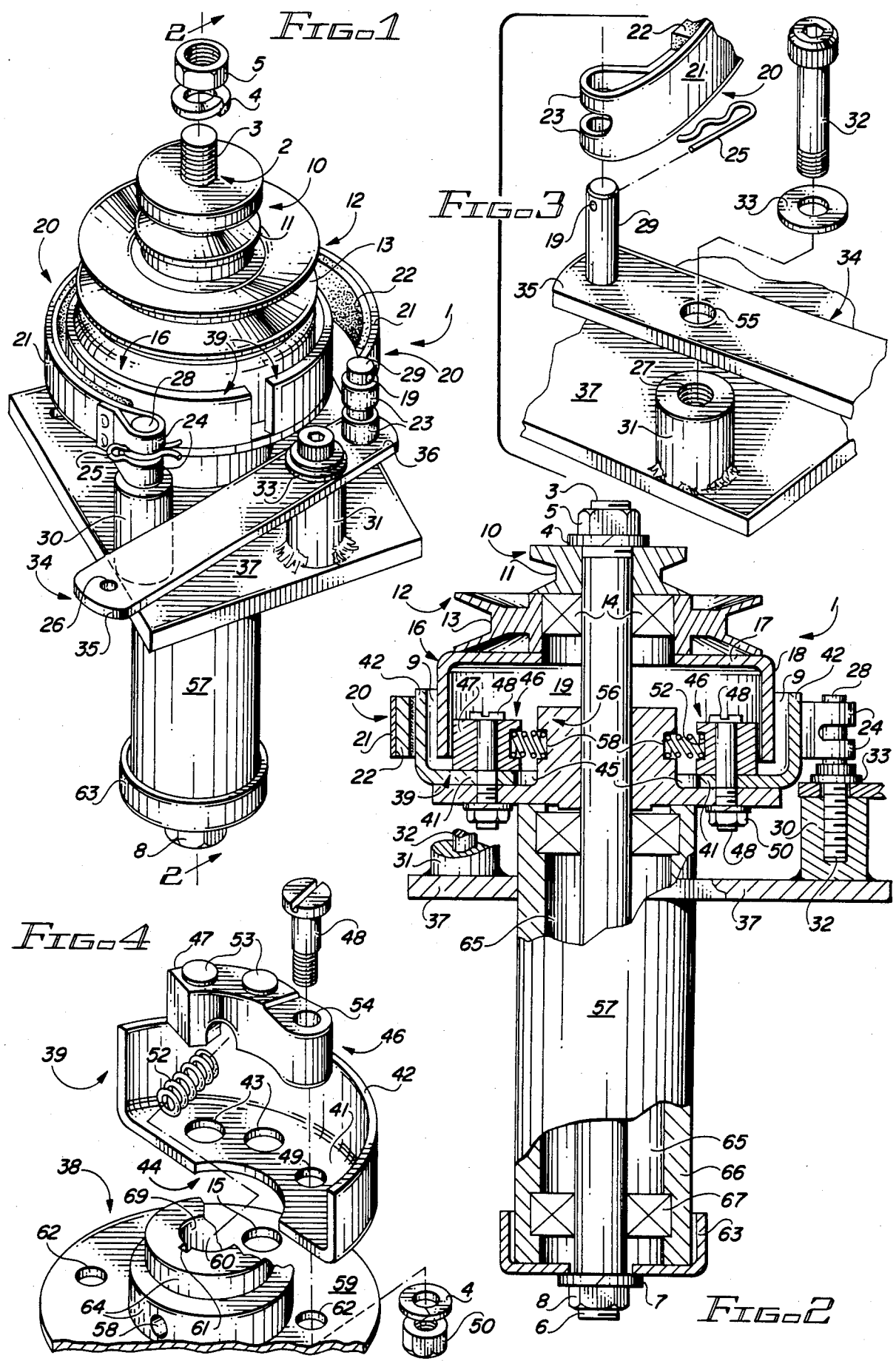

FIG.5
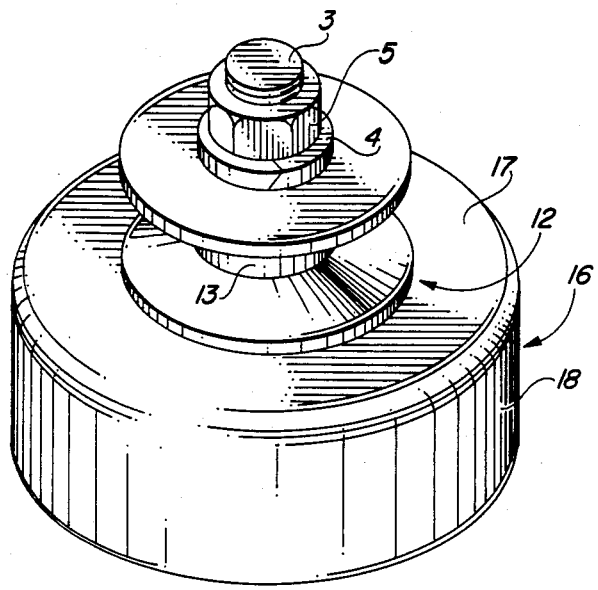
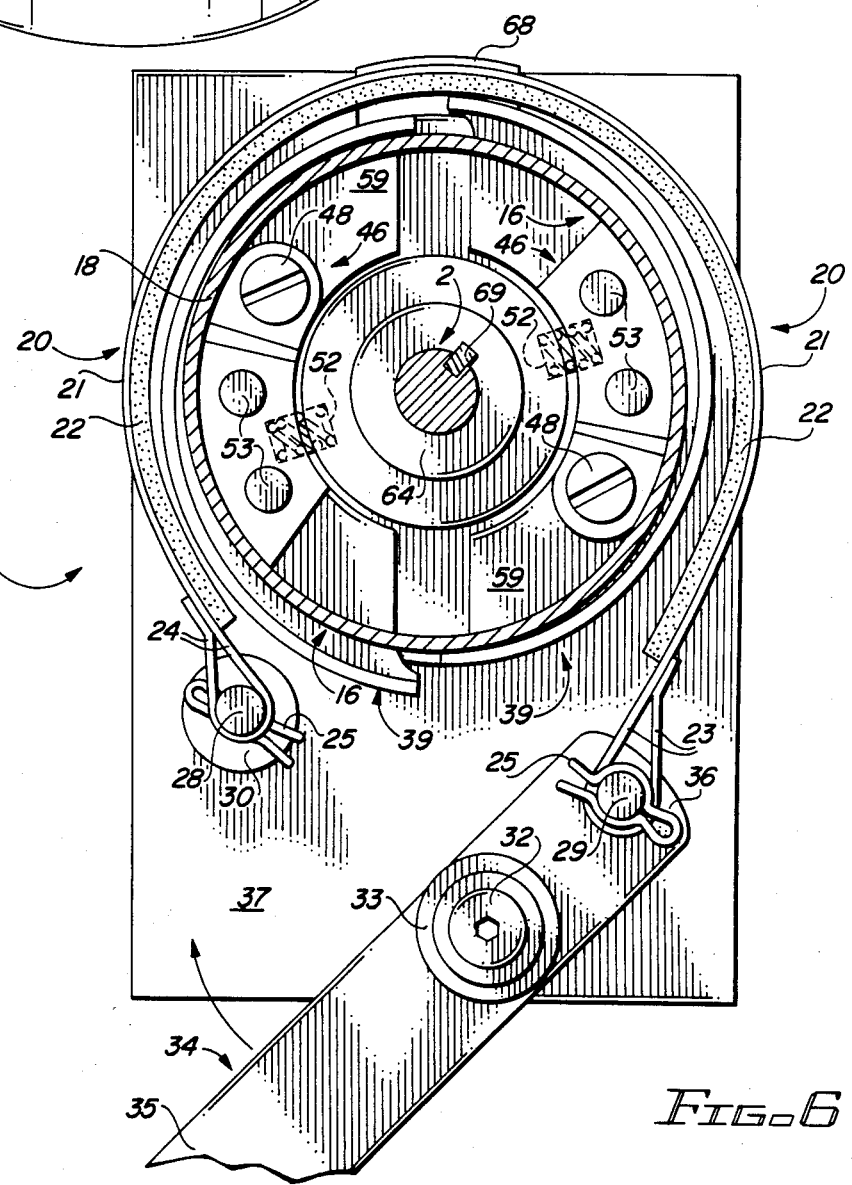
FIG.6

CLUTCH AND BRAKE APPARATUS

BACKGROUND OF THE INVENTION

1. Field of the Invention

In a common rotary lawnmower design, a cutter blade which is sharpened on opposite edges is mounted directly to a vertical shaft which extends from the crankshaft of an engine. The blade is either rigidly connected to the crankshaft or it is attached by means of a friction assembly which is designed to minimize damage to the blade or shaft when the rotating blade strikes a solid object. However, such friction safety devices do not always operate properly and it is not uncommon for blade shafts to be bent and blades dulled or damaged as a result of the blade striking such an object. Furthermore, the blade frequently becomes clogged with heavy grass, particularly under circumstances when mowing is attempted when the grass is wet. This activity stalls the engine and the grass must then be cleared from the underside of the housing or blade shroud and the blade before restarting the engine. It is well known that both the rigid and frictional drive assemblies are dangerous to the user, since the blade continues to operate unless the object struck is sufficiently solid or heavy to either stop the engine, bend the shaft or blade or engage the friction mechanism.

Due to the ever-increasing number of gasoline powered lawnmowers in use, there has been a growing concern for the danger involved in using both fixed and frictional blade lawnmowers. Since the blade of a fixed or frictional drive lawnmower continues to rotate when the engine is idling, there is always danger of injury, particularly to the feet when the operator is involved in such activity as emptying a grass bag or making adjustments to the lawnmower.

This invention relates to powered lawnmowers and more particularly, to gasoline powered lawnmowers of the rotary design where the operator walks behind and pushes or guides the mower as it operates. A primary object of the invention is to equip such lawnmowers with a reliable clutch and brake apparatus which is operated by a V-belt or chain and is located above the blade shroud or housing and which will quickly and efficiently stop rotation of the mower blade without stopping the engine when the operator releases his grip on a deadman control mounted on or near the handle of the mower.

There have been many attempts to equip rotary gasosline powered lawnmowers with devices which will arrest the rotating blade upon striking an object. These attempts fall basically into two categories, depending upon whether or not the blade is fixed to the drive shaft of the engine. Under circumstances where the blade is driven directly from the engine, release of the deadman control stops the engine immediately. In the second category where the blade is not connected directly to the crankshaft of the engine, the blade is disengaged from the engine and application of a brake terminates rotation of the blade upon release of the deadman control. The common technique of stopping the engine by interrupting firing of the sparkplug when the deadman control is released has proved inadequate to stop the blade sufficiently fast to prevent injury from the rotating blade. A time lag of from 4 to 6 seconds between the instant the spark in the sparkplug is terminated and the blade has stopped rotating is not unusual; although the engine is no longer operating, the blade has usually developed sufficient momentum to cause serious injury to the operator or bystander. Another problem which is inherent in this blade braking technique is the inconvenience of restarting the engine before the cutting operation can commence. Because of this inconvenience and because the natural inclination of the operator is to allow the engine to continue running under all circumstances of lawnmowing, there is a great tendency for the operator to deactivate or disengage the deadman throttle control and override the engine-kill safety feature.

Accordingly, the best technique for terminating rotation of a lawnmower blade is to effect not only disengagement of the blade while the engine is continuing to run but also a means for rapidly stopping blade rotation when the disengagement is implemented. Furthermore, the disengaging and blade arrest mechanicsm should be accessible for maintenance purposes and located in a position on the lawnmower where glass clippings and dirt will not impede operation.

The potential for minimizing hazard from injury due to the rotating blade in gasoline powered rotary lawnmowers has received so much attention, that on Jul. 22, 1974, the Consumer Product Safety Commission initiated a proceeding to develop a safety standard for such lawnmowers. On Feb. 26, 1979, this Commission issued a safety standard for powered rotary lawnmowers which requires that all such mowers manufactured after Dec. 31, 1981, be equipped with a deadman control and a blade control system which will accomplish the following objectives: first, prevent the blade from rotating unless the operator activates a blade rotation control; secondly, require continuous contact with the blade rotation control in order that the blade continue to be driven; and thirdly, the blade rotation control must cause the blade to stop within 3 seconds after release.

2. Description of the Prior Art

A "Lawnmower Blade Mounting and Control" is disclosed in U.S. Pat. No. 3,026,665, dated Mar. 27, 1962, to S. J. Hoff. This early Hoff patented device is characterized by an assembly mounted beneath the lawnmower housing and including a depending engine shaft, with a blade mounted by bolts on a hub and rotatably supported on a sleeve bearing carried by the lower end of the shaft. The hub carries a clutch drum having an outer cylindrical wall which stands upward from the upper face of the hub and forms the driven element of a centrifugal clutch for connecting the blade to the shaft. The driving element of the centrifugal clutch includes an assembly which is keyed to the shaft within the clutch drum. A pair of shoes are spring-biased against, and selectively engage the clutch drum such that at rest and at idling speeds, springs retain the shoes in retracted position and the shoes positively engage the drum at predetermined higher speeds. U.S. Pat. No. 4,044,533, dated Aug. 30, 1976, to Gerald H. Wick, discloses a "Lawnmower Blade Clutch and Brake". This device includes a blade housing located beneath the blade housing and supportive for travel over the ground, a drive shaft mounted for rotation by the blade housing and including a clutch drum, an engine connected to the drive shaft and a cutter blade located in the blade housing and mounted for rotation coaxially with and relative to the drive shaft. A clutch shoe is connected to the cutter blade for common rotation therewith and for movement relative to a position of engagement with a clutch drum. A spring urges the clutch shoe into engagement a brake member is movable between a first position where the brake member is spaced from the brake surface, and a second position where the brake member engages the brake surface to brake rotation of the cutter blade and displace the clutch shoe from the position of engagement against the action of the spring. A "Lawnmower Blade Control Apparatus" is disclosed in U.S. Pat. No. 4,148,173, dated Apr. 10, 1979, to Stephen J. Hoff. In this device, a lawnmower blade mounted coaxially at the bottom of a vertical engine drive shaft is normally declutched from the shaft and stopped by a brake responsive to a clutch mechanism located beneath the lawnmower housing. When the engine is accelerated, the blade is released by the brake and clutched by a centrifugal clutch to the engine-driven shaft. The blade carier, clutch and brake drum are included in a compact assembly on a hub and are mounted as a unit on the engine shaft. A flywheel is also included on the hub, and the assembly and flywheel are protected from blade cuttings by a protective bowl shaped to surround the flywheel and form a mounting platform for a brake band which encircles the drum. U.S. Pat. No. 4,205,737, dated Jun. 3, 1980, to Joseph R. Harkness, et al, discloses a "Clutch-Brake Mechanism for Rotary Mower Engines". In this patent, a completely enclosed combination clutch and brake mechanism is permanently mounted at the bottom of a vertical shaft internal combustion engine and is interposed between the crankshaft and a coaxial blade shaft projecting from the bottom of the enclosed clutch and brake mechanism. A cutting blade is fixed to the shaft and a rotatable driving member is attached to the engine crankshaft. A rotatable driven member is fixed to the blade shaft and these members are coupled by radially outwardly movable clutch elements carried by the driven member and frictionalaly engaged with a radially inwardly facing circular surface on the driving member. Springs and centrifugal force cooperate to effect the driving engagement. A "Clutch-Brake Mechanism" is disclosed in U.S. Pat. No. 4,253,556, dated Mar. 3, 1981, to Hugh A. Zindler. The Zindler patent details a clutch mechanism which is operated directly from the crankshaft of a gasoline engine. The mechanism includes segmental clutch shoes which are operatively deployed between coaxial drive and driven members and are movable radially and circumferentially between these members into and out of clutching engagement with a drum located on the drive member. U.S. Pat. No. 4,279,117, dated Jul. 21, 1981, to Randall K. Lawrence, et al, discloses a pair of centrifugally movable shoes pivotally mounted to a blade support in a clutch apparatus which is mounted beneath the blade shroud or housing of a lawnmower. Drive bands are supported by the shoes and are positioned to be engagable with a source of rotational movement, whereby such movement is translated to the blade by the bands, the shoes and the blade support. A brake band selectively engages the shoes to decelerate them and brake the blade. U.S. Pat. No. 4,290,512, dated Sep. 22, 1981, to Hugh A. Zindler, includes a drum carried on the drive member of a rotary lawnmower for driving engagement by clutch shoes carried by the driven member. The clutch shoes are normally biased into driving engagement with the drum and a brake band is utilized to move the clutch shoes out of engagement with the drum and stop rotation of the driven element without interrupting the rotation of the drive member. A "Lawnmower Blade Rotation Warning Device" is disclosed in U.S. Pat. No. 4,297,829, dated Nov. 3, 1981, to Stephen J. Hoff. The subject warning device includes a rotary blade driven from a motor through a centrifugal clutch and normally stopped by a brake which is released by deadman control. The clutch and warning device are mounted beneath the blade shroud of the lawnmower. U.S. Pat. No. 4,326,368, dated Apr. 27, 1982, to Stephen J. Hoff, details a "Clutch and Brake for Rotary Lawnmower" which includes a driving drum and a driven blade carrier, the carrier having clutch shoes engagable with the inside of the drum, and brake drum segments fixed to the shoes and disposed outside the drum for engagement by an encircling brake band. The brake band applies braking drag and additionally serves to mechanically force the segments inwardly to disengage the clutch shoes. The clutching device is mounted beneath the blade housing of the lawnmower.

It is an object of this invention to provide a new and improved clutch and brake apparatus which is indirectly connected to the engine crankshaft by means of a V-belt or chain and is located above the blade housing. The driven component of the clutch and brake apparatus is characterized by a split drum assembly carrying a pair of spring-biased brake shoes and cooperating drum segments pivotally mounted on a hub which is keyed to the drive shaft. The drive element is a pulley drum which rotates freely on the drift shaft when the apparatus is disengaged and is coextensive in alignment with the brake shoes, and clutch disengagement is effected by means of a brake band encircling the drum segments in the split drum assembly to selectively remove the brake shoes from contact with the pulley drum and prevent rotation of the lawnmower blade.

Another object of the invention is to provide a new and improved clutch and brake apparatus which is mounted above the lawnmower housing and is characterized by a shaft provided with a split drum assembly driven element carrying a pair of brake shoes and split drums which are pivotally-mounted on a hub and are spring-biased into contact with a pulley and drum drive component, which pulley and drum are rotatable with the shaft in drive mode to selectively drive the split drum assembly responsive to rotation of the pulley and drum by a V-belt or other drive means. Disengagement and free rotation of the pulley and drum on the shaft is effected by contact between a brake band and the split drums to retract the brake shoes from contact with the drum in the pulley and drum component of the clutch and brake apparatus.

A still further object of this invention is to provide a clutch and brake apparatus which is mounted above the blade shroud or housing of a rotary lawnmower an is operable by belt or chain drive cooperation with an engine to both disengage the drive pulley from the drive shaft and stop rotation of the blade within 3 seconds, responsive to release of a deadman lever or control provided on the lawnmower and linked to the clutch and brake apparatus.

A still further object of this invention is to provide a new and improved clutch and brake apparatus which is indirectly driven by a gasoline-powered engine and is mounted above the blade shroud or housing of a rotary lawnmower and is further characterized by a driven element which includes a split drum assembly pivotally carrying a pair of brake shoes and cooperating-drum segments and a hub keyed to a rotating shaft. A cooperating drive element is characterized by a drive drum and pulley which rotate on the shaft, wherein the brake shoes are normally biased into contact with the rotating drive drum pulley to cause the hub and blade to rotate, and the brake shoes are released from contact with the drum responsive to tightening of a brake band around the drum segments in the split-drum assembly to selectively stop rotation of the blade without killing the engine.

SUMMARY OF THE INVENTION

These and other objects of the invention are provided in a clutch and brake apparatus which is positioned above the blade shroud or housing of a rotary lawnmower and is operated by means of a V-belt and pulley connection from a gasoline engine. The clutch and brake apparatus includes a driven element which is characterized by a shaft, a split-drum assembly having a pair of drum segments with brake shoes fixedly attached thereto in opposed relationship, and a hub keyed to the shaft and pivotally receiving the drum segments and brake shoes. A drum and pulley drive component are selectively rotatable on the shaft and responsive to engagement of a brake band with the drum segments in the split-drum assembly, to provide disengagement between the brake shoes and drum and terminate rotation of the blade when the deadman control is released, without stopping the engine.

BRIEF DESCRIPTION OF THE DRAWING

The invention will be better understood by reference to the accompanying drawings, wherein:

FIG. 1 is a perspective view of a preferred embodiment of the clutch and brake apparatus of this invention;

FIG. 2 is a sectional view, taken along line 2—2 of the clutch and brake apparatus illustrated in FIG. 1;

FIG. 3 is an exploded view, partially in section, of a preferred brake band mount in the clutch and brake apparatus;

FIG. 4 is an exploded view of a drum segment in the split-drum assembly, illustrating a preferred technique for mounting the brake shoes;

FIG. 5 is a perspective view of an alternative embodiment of the pulley and rotating drum assembly;

FIG. 6 is a top elevation of the split drum assembly with the clutch and brake apparatus in disengaged configuration.

DESCRIPTION OF THE PREFERRED EMBODIMENTS

Figure 7:
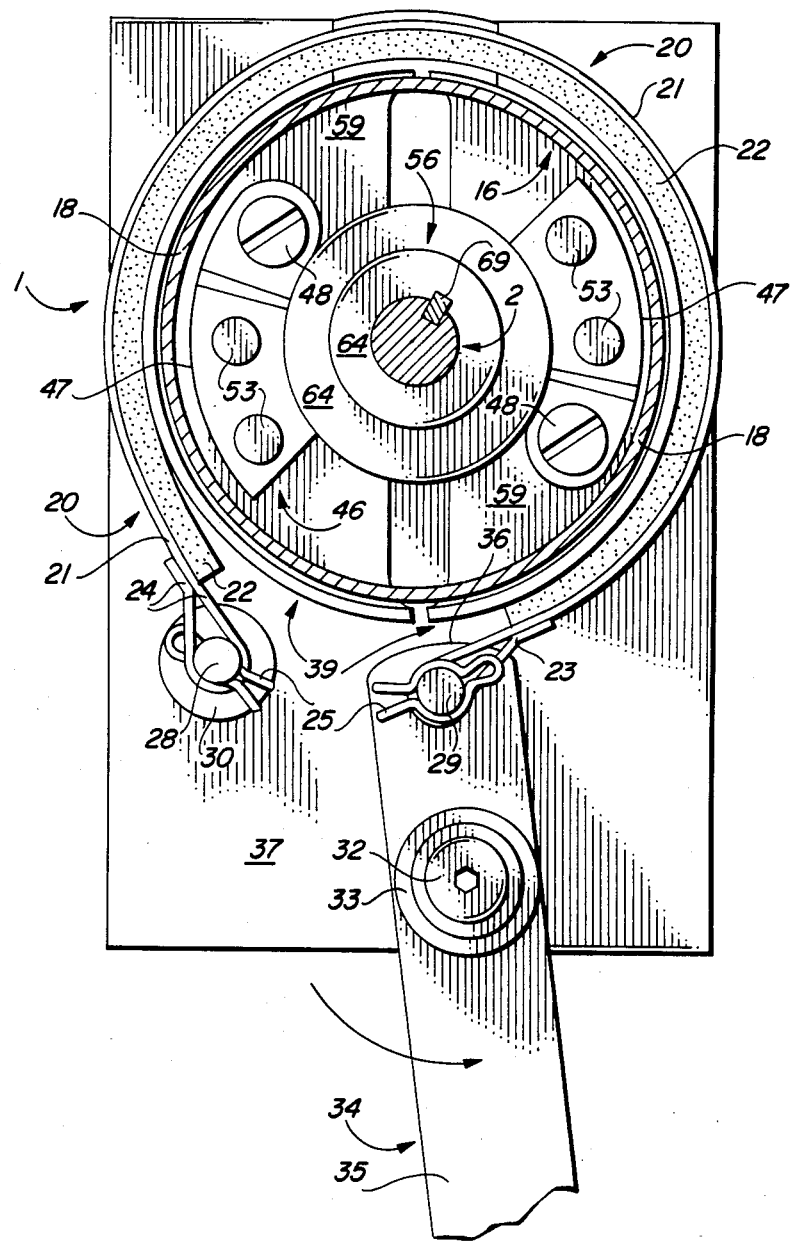
FIG. 7 is a top elevation of the split drum assembly with the clutch and brake apparatus in engaged configuration.

Referring to FIGS. 1, 2 and 4 of the drawings, the clutch and brake apparatus of this invention is generally illustrated by reference numeral 1 and includes a shaft 2, provided with top shaft threads 3 at one end and bottom shaft threads 6 at the opposite end. Under circumstances where the lawnmower which recieves the clutch and brake apparatus 1 is self-propelled, a top pulley 10 is provided adjacent a bottom or drive pulley 12, which drive pulley 12 is attached to, or formed integrally with the drum base 17 of a pulley drum 16. In a preferred embodiment of the invention, the top pulley 10 is fitted with a top pulley groove 11 and is keyed to the shaft 2, while the drive pulley 12 is provided with a drive pulley groove 13 and the drive pulley 12 is allowed to freely rotate on the shaft 2 when the clutch and brake apparatus 1 is disengaged, as hereinafter described. A pulley bearing 14 is provided in the drive pulley 12 to better facilitate smooth rotation of the drivey pulley 12 on the shaft 2 and a top nut 5 and lock washer 4 serve to secure the top pulley 10 and drive pulley 12 on the shaft 2. A split-drum assembly 38 is characterized by a pair of drum segments 39, cooperating brake shoes 46 and a hub assembly 56, as is more particularly illustrated in FIG. 4. The brake shoes 46 and drum segments 39 are pivotally mounted to the hub plate 59 of the hub assembly 56, by means of shoe bolts 48, which project through shoe bolt apertures 54 in the brake shoes 46 and the bolt apertures 49, in the drum segment bases 41. The shoe bolts 48 are secured by means of lock washers 4 and shoe nuts 50. The stepped hub 64 of the hub assembly 56 is keyed to the shaft 2 by means of a key 69, which is inserted in the keyway 61 provided in the shaft 2, as illustrated in FIG. 4. The shaft 2 extends through the shaft aperture 60, which is centered in the hub 64 and the drum segments 39 and brake shoes 46 are disposed in spaced, facing relationship on the hub plate 59. A clearance gap 44 is provided in each drum segment base 41 to facilitate pivoting of the drum segment 39 inwardly toward the hub 64, as hereinafter described. A spindle housing 57 extends downwardly from the hub plate 59 of the hub assembly 56 and is terminated on the bottom end by a cap 63. The cap 63 is secured to the shaft 2 and carries a cutter blade (not illustrated) by means of a bottom nut 8 and a bottom washer 7. Shaft bearings 67 are located in spaced relationship in the housing interior 65 of the spindle housing 57 and are seated in slots provided in the housing wall 66, in order to facilitate smooth rotation of the shaft 2, the cutter blade (not illustrated) and the cap 63, when the clutch and brake apparatus 1 is in the engaged configuration.

Referring again to FIG. 4 of the drawings in a most preferred embodiment of the invention, the brake shoes 46 are configured with curved shoe contact surfaces 47 and as heretofore described, are pivotally bolted, along with the drum segments 39, respectively, to the hub plate 59, by means of shoe bolts 48. Base apertures 43 are provided in each drum segment base 41 of the drum segments 39, in order to accommodate locator pins 53, extending through the brake shoes 46, to locate and fixedly secure the brake shoes 46 on the drum segment bases 41, respectively. The brake shoes 46 are oriented with the shoe contact surface 47 fixedly spaced from the circular drum segment flange 42 of each drum segment 49, respectively. The projecting ends of the locator pins 53 extend through the drum segment bases 41 into the enlarged guide apertures 15 provided in the hub plate 59, and since the guide apertures 15 are larger than the ends of the locator pins 53, the drum segments 39 and brake shoes 46 are allowed to pivot on the shoe bolts 48 and move with respect to the hub plate 59, within the confines of the guide apertures 15. Springs 52 are seated in the spring seats 51 of the brake shoes 46 and the spring recesses 58, located in the base of the hub 64, to bias the shoe contact surfaces 47 of the brake shoes 46 against the inside surface of the downwardly-extending drum flange 18 of the pulley drum 16. Accordingly, the drum segments 39 and brake shoes 46 are pivotable on the shoe bolts 48 against the tension in the springs 52, to move the drum segments 39 closer to each other and remove the shoe contact surface 47 from engagement with the drum flange 18, of the pulley drum 16 as hereinafter described.

Referring now to FIGS. 2 and 4 of the drawings, in a most preferred embodiment of the invention the pulley drum 16 is characterized by a drum base 17 and a circular, downwardly-extending drum flange 18, which extends between the drum segment flanges 42 of each of the drum segments 39 and the shoe contact surfaces 47 of the brake shoes 46, respectively. The proximity of the brake shoes 46 to the drum flange 18 is such that the shoe contact surfaces 47 are normally in contact with the inside surface of the drum flange 18 by operation of the springs 52. Furthermore, while the brake shoes 46 and the drum flange 18 are in this relative position, a space 9 exists between each drum segment flange 42 of the corresponding drum segment 39 and the outside surface of the drum flange 18, and a travel space 45 exists between the clearance gap 44 of each drum segment base 41 and the base of the hub 64. In another most preferred embodiment of the invention, a brake band 20 encircles the drum segments 39, as heretofore described, and is designed to tighten and force the drum segment flange 42 of each drum segment 39 inwardly to close the space 9 and the travel space 45, and displace the shoe contact surface 47 of the brake shoes 46 from contact with the inside surface of the drum flange 18. Since the drum segments 39 are pivotally secured to the hub plate 59 of the hub assembly 56 and the hub 64 is keyed to the shaft 2, disengagement of the brake shoes 46 from the pulley drum 16 allows the pulley drum 16 and the drive pulley 12 to freely rotate on the shaft 2 responsive to driving engagement with the engine. This disengagement and free rotation of the drive pulley 12 is contemporaneous with rapid stopping of the shaft 2, hubcap 63 and the lawnmower blade attached to the shaft 2 and hubcab 63, by operation of the brake band 20.

As illustrated in FIGS. 1-3, in still another most preferred embodiment of the invention the spindle housing 57 extends through and is welded or otherwise secured in perpendicular relationship to a flat mount plate 37. A fixed post 30 projects upwardly parallel to the spindle housing 57, from a fixed mount in the mount plate 37. A pivot post 31 also projects upwardly from fixed attachment to the mount plate 37 and is spaced from the fixed post 30. A fixed post pin 28 extends from the fixed post 30 and secures the fixed post loops 24, located on one end of the body 21 of the brake band 20, to the fixed post pin 28. A brake band lever 34, having a lever aperture 55, is pivotally secured to the pivot post 31, which is provided with internal threads 27, by means of a threaded cap screw 32 and cooperating cap screw washer 33. The pivot end 36 of the brake band lever 34 carries a lever post 29 and projects slightly past the point of pivot at cap screw 32, away from the fixed post 30 and the opposite handle end 35 of the brake band lever 34 projects past the fixed post 30. The opposite end of the body 21 of the brake band 20 is secured by means of lever post loops 23 to the lever post 29 and referring to FIG. 6, in a most preferred embodiment, a brake band brace 68 extends from the body portion 21 to the mount plate 37. Loop retainer pins 25 project through post apertures 19, located in the lever post 29 and the fixed post pin 28, respectively, in order to secure the lever post loops 23 on the lever post 29 and the fixed post loops 24 on the fixed post pin 28, respectively. Accordingly, referring now to FIGS. 1 and 6 of the drawings, when the handle end 35 of the brake band lever 34 is pivoted toward the fixed post 30 in the direction of the arrow, the brake band 20 loosens on the drum segments 39 of the split drum assembly 38. Conversely, referring now to FIG. 7 of the drawings, when the handle end 35 of the brake band lever 34 is pivoted in the opposite direction as indicated by the arrow, the brake band 20 tightens on the drum segments 39 of the split drum assembly 38 to disengage the clutch and brake apparatus 1.

As further illustrated in the drawings, the brake band 20 is most preferably characterized by a metal body portion 21 with a liner 22 attached to the body portion 21 and positioned facing the drum segments 39 of the split drum assembly 38. Accordingly, when the handle end 35 of the brake band lever 34 is pivoted in the direction of the arrow as illustrated in FIG. 7, the liner 22 contacts the rotating drum segment flanges 42 of the drum segments 39, to rapidly prevent rotation of the split drum assembly 38, the shaft 2 and the rotating blade.

Referring now to FIGS. 1 and 5 of the drawings, it will be appreciated by those skilled in the art that in the embodiment illustrated in FIG. 1, the top pulley 10 can be keyed directly to the shaft 2 and oriented to receive a V-belt which operates the self-propelled mechanism of the lawnmower. Under circumstances where a self-propelled feature is not desired in the lawnmower, a single drive pulley 12 can be utilized in cooperation with the shaft 2, as illustrated in FIG. 5. It will be further appreciated by those skilled in the art that under circumstances where the top pulley 10 is utilized to operate a self-propelled mechanism in the lawnmower, the top pulley 10 can be connected to or separately rotatable with respect to the drive pulley 12, depending upon whether the self-propelled mechanism is to be operated when the clutch and brake apparatus 1 is in disengaged configuration. If the self-propelled apparatus 1 is to be operated while the clutch and brake apparatus 1 are disengaged, then the top pulley 10 must be connected to the drive pulley 12 in order to facilitate continued free rotation of the top pulley 10 on the shaft 2 when the drive pulley 12 also rotates freely on the shaft 2 responsive to operation of the engine. Conversely, where it is desired to disengage the self-propelled mechanism when the clutch and brake apparatus 1 is disengaged, then the top pulley 10 must be keyed to the shaft 2 and the drive pulley 12 independently rotatable on the shaft 2 when the clutch and brake apparatus 1 is disengaged.

In operation and referring again to the drawings, when the clutch and brake apparatus 1 is installed in a suitable mounting means above the blade shroud or housing of a lawnmower, the handle end 35 is connected by means of the handle end aperture 26 to a linkage (not illustrated) which is secured to a deadman bar or lever (not illustrated) located near the handle or grip portion of the lawnmower. This linkage is so oriented and designed that closure of the deadman lever against the handle or grip bar of the lawnmower loosens the brake band 20 from the contact with the drum segments 39 in the split drum assembly 38 and facilitates contact between the shoe contact surfaces 47 of the brake shoes 46 and the inside surface of the drum flange 18. A linkage spring (not illustrated) in the linkage apparatus maintains tension on the brake band lever 34 to normally tension the brake band 20 and prevent rotation of the split drum assembly and blade, as illustrated in FIG. 7, when the deadman lever is not pressed against the grip bar. This contact overrides the bias in the springs 52, and moves the brake shoes 46 away from the pulled drum 16. Accordingly, when the deadman lever is pressed, the shaft 2 is permitted to rotate with the drive pulley 12 and under circumstances where a top pulley 10 is also provided on the shaft 2, the self-propelled feature of the lawnmower is operable. Blade speed control in the lawnmower is now responsive directly to throttle control and the lawnmower is operated in conventional fashion. Since the brake shoes 46 are subjected to centrifugal force as the shaft 2 and split drum assembly 38 rotate, higher rotational speeds of the shaft 2 and the split drum assembly 38 effect tighter contact between the respective shoe contact surfaces 47 of the brake shoes 46 and the inside surface of the drum flange 18. If the blade is to be stopped for any reason whatsoever, the deadman lever is released and the linkage between the deadman lever and the handle end 35 of the brake band lever 34 is caused to rotate in the direction of the arrow as illustrated in FIG. 7 by operation of the linkage spring (not illustrated). This manipulation of the brake band lever 34 causes the liner 22 of the brake band 20 to tighten against the drum segment flanges 42 of the drum segments 39 and pivot the drum segments 39 and the brake shoes 46 inwardly on the shoe bolts 48, to disengage the shoe contact surfaces 47 from the inside surface of the drum flange 18.

This action allows the pulley drum 16 to freely rotate responsive to continued driving of the drive pulley 12 and also quickly stops the blade by stopping the split drum assembly 38 and the shaft 2, responsive to pressure applied by the brake band 20.

While the preferred embodiments of the invention have been described above, it will be recognized and understood that various modifications and combinatins may be made and used therein and the appended claims are intended to cover all such modifications and combinations which may fall within the sprit and scope of the invention.

Having described my invention with the particularity set forth above what is claimed is:

1. A clutch and brake apparatus for a power-driven implement comprising a shaft; at least one drive pulley rotatable on said shaft, said drive pulley cooperating in driving relationship with the power source in the power-driven implement; a pulley drum fixedly attached to said drive pulley; a hub assembly keyed to said shaft and a hub plate provided on said hub assembly; a pair of arcuate drum segments pivotally mounted on said hub plate in a plane which is substantially perpendicular to the axis of said shaft; a pair of curved brake shoes fixedly carried by said drum segments, respectively, said brake shoes located inwardly of said pulley drum; and a pair of coil springs provided in cooperation with said brake shoes for normally biasing said brake shoes into contact with said pulley drum; and a brake band normally disposed in close proximity to said drum segments, said brake band operable to selectively engage said drum segments and disengage said brake shoes from said pulley drum and stop rotation of said shaft, without interrupting rotation of said drive pulley and said pulley drum on said shaft and operation of the power source.

2. The clutch and brake apparatus of claim 1 further comprising lever means attached to one end of said brake band and wherein the opposite end of said brake band is fixed, whereby said brake band is selectively tightened on said drum segments responsive to manipulation of said lever means.

3. A clutch and brake apparatus for a lawnmower having an engine and a blade shroud, said clutch and brake apparatus comprising:

(a) a vertically oriented shaft located above the blade shroud and journalled for rotation;
(b) a drive pulley rotatable on said shaft;
(c) a first pulley drum fixedly carried by said drive pulley, said first pulley drum adapted for driving cooperation with the engine in the lawnmower;
(d) a hub assembly fixedly carried by said shaft and a hub plate fixedly provided in said hub assembly;
(e) a pair of arcute drum segments pivotally carried by said hub plate in oppositely-disposed relationship; a pair of brake shoes fixedly carried by said drum segments, respectively, with said first pulley drum oriented between said drum segments and said brake shoes; and
(f) a brake band normally disposed in close proximity to said drum segments, said brake band operable to engage said drum segments and retract said brake shoes from said pulley drum and stop rotation of said driven member and said shaft without interrupting rotation of said drive pulley and said pulley drum on said shaft and operation of the engine.

4. The clutch and brake apparatus of claim 3 wherein said bias means is a pair of coil springs biasing said brake shoes against said pulley drum when said clutch and brake apparatus is engaged.

5. The clutch and brake apparatus of claim 3 further comprising lever means attached to one end of said brake band and wherein the opposite-end of said brake band is fixed, whereby said brake band is selectively tightened on said drum segments responsive to manipulation of said lever means.

6. The clutch and brake apparatus of claim 3 wherein said bias means is a pair of coil springs biasing said brake shoes against said pulley drum when said clutch and brake apparatus is engaged and further comprising lever means attached to one end of said brake band and wherein the opposite end of said brake band is fixed, whereby said brake band is selectively tightened on said drum segments responsive to manipulation of said lever means.

7. The clutch and brake apparatus of claim 3 wherein the lawnmower is adapted to include a self-propelled mechanism and further comprising a second pulley fixedly carried by said shaft and cooperating with the self-propelled mechanism in driving relationship.

8. The clutch and brake apparatus of claim 3 further comprising lever means attached to one end of said brake band and wherein the opposite end of said brake band is fixed, whereby said brake band is selectively tightened on said drum segments responsive to manipulation of said lever means; and wherein:

(a) said bias means is a pair of coil springs biasing said brake shoes against said pulley drum when said clutch and brake apparatus is engaged; and
(b) the lawnmower is adapted to include a self-propelled mechanism and further comprising a second pulley fixedly carried by said shaft and cooperating with the self-propelled mechanism in driving relationship.

9. The clutch and brake apparatus of claim 3 wherein the lawnmower is adapted to include a self-propelled mechanism and further comprising a second pulley carried by said drive pulley.

10. The clutch and brake apparatus of claim 3 further comprising lever means attached to one end of said brake band and wherein the opposite-end of said brake band is fixed, whereby said brake band is selectively tightened on said drum segments responsive to manipulating of said lever means; and wherein:
  (a) said bias means is a pair of coil springs biasing said brake shoes against said pulley drum when said clutch and brake apparatus is engaged; and
  (b) wherein the lawnmower is adpated to include a self-propelled mechanism and further comprising a second pulley carried by said drive pulley.

11. A clutch and brake apparatus for an engine-driven lawnmower comprising:
  (a) a driven member characterized by a driven shaft; a hub keyed to said shaft and a hub plate fixedly carried by said hub; a pair of drum segments pivotally carried by said hub plate in oppositely-disposed relationship; a pair of brake shoes fixedly attached to said drum segments, respectively; bias means locatd between said hub and said brake shoes for biasing said brake shoes and said drum segments outwardly of said shaft; and a brake band substantially encircling said drum segments, said brake band adapted to tighten against said drum segments and force said drum segments and said brake shoes toward said shaft against the bias of said bias means; and
  (b) a drive member characterized by at least one pulley rotatable on said shaft and driven by the engine, and a pulley drum fixedly carried by said pulley, said pulley drum positioned between said drum segments and said brake shoes with said brake shoes normally engaging said pulley drum responsive to said bias means when said clutch and brake apparatus is engaged, and said brake shoes disengaging said pulley drum responsive to tightening of said brake band around said drum segments when said clutch and brake apparatus is disengaged.

12. The clutch and brake apparatus of claim 11 wherein said bias means is a coil spring engaging each of said brake shoes.

13. The clutch and brake apparatus of claim 11 wherein the lawnmower is adapted to include a self-propelled mechanism and further comprising a second pulley fixedly carried by said shaft and cooperating with the self-propelled mechanism in driving relationship.

14. The clutch and brake apparatus of claim 11 wherein:
  (a) said bias means is a coil spring engaging each of said brake shoes; and
  (b) the lawnmower is adapted to include a self-propelled mechanism and further comprising a second pulley fixedly carried by said shaft and cooperating with the self-propelled mechanism in driving relationshp.

* * * * *